June 27, 1961     H. L. ANDERSON ET AL     2,990,354

NUCLEAR FISSION CHAIN REACTING SYSTEM

Filed March 24, 1945     6 Sheets-Sheet 1

INVENTORS
Herbert L. Anderson
Harrison S. Brown

By: Robert A. Lavender
Attorney

INVENTOR.
Herbert L. Anderson
Harrison S. Brown
By: Robert A. Lavender
Attorney

INVENTOR.
Herbert L. Anderson
Harrison S. Brown

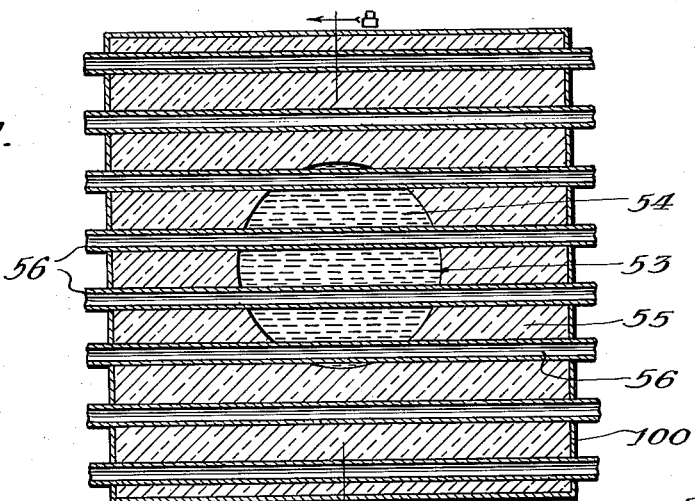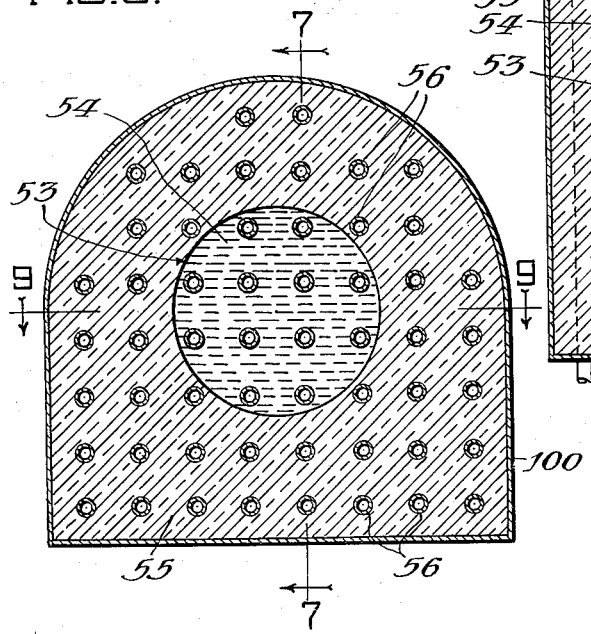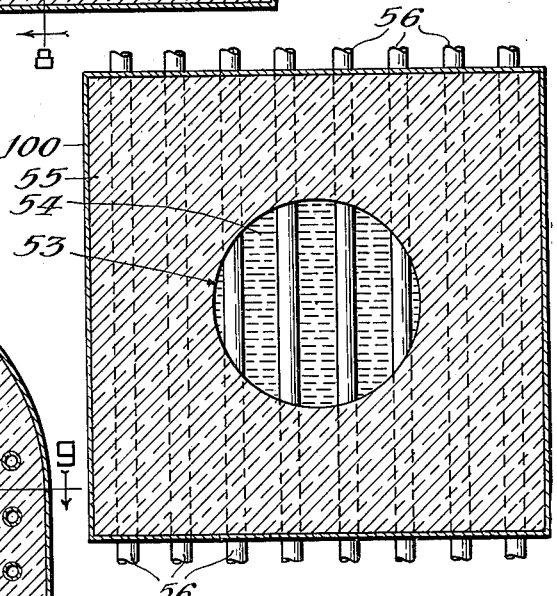

INVENTORS
Herbert L. Anderson
Harrison S. Brown
By: Robert A. Lavender
Attorney.

United States Patent Office 2,990,354
Patented June 27, 1961

2,990,354
NUCLEAR FISSION CHAIN REACTING SYSTEM
Herbert L. Anderson, Chicago, Ill., and Harrison S. Brown, Oak Ridge, Tenn., assignors to the United States of America as represented by the United States Atomic Energy Commission
Filed Mar. 24, 1945, Ser. No. 584,688
25 Claims. (Cl. 204—193.2)

Our invention relates to the general subject of nuclear fission, and more particularly to a means and a method for creating a self-sustaining chain reaction by nuclear fission of uranium by thermal neutrons where the uranium source is in fluid form, even when natural uranium having a $U^{235}$ isotope content of approximately $1/139$ of the $U^{238}$ content is utilized.

The present application is a continuation in part of our co-pending application Serial Number 520,730, filed February 2, 1944, which has become abandoned.

As a result of the chain reaction, when $U^{238}$ is present (as in natural uranium), transuranic element $94^{239}$, known as plutonium, is produced. This material is fissionable and is valuable when added to natural uranium for use in a chain reacting system, as a fissionable body in lieu of or conjunction with natural uranium.

Natural uranium contains both uranium isotopes $U^{235}$ and $U^{238}$ in the ratio of 1 to 139. The $U^{235}$ is the isotope fissionable by slow neutrons.

When fission occurs in the $U^{235}$ isotope, the following reaction takes place:

$$_{92}U^{235} + \text{neutron} \rightarrow A + B + \text{about 2 neutrons (average)}$$

where "A" represents "light" fission fragments having atomic masses ranging from 83 to 99 inclusive and atomic number from 34 to 45 inclusive; for example, Br, Kr, Rb, Sr, Y, Zr, Cb, Mo, Ma, Ru, and Rh; and "B" represents "heavy" fission fragments having atomic masses ranging from 127 to 141 inclusive, and atomic numbers from 51 to 60 inclusive; for example, Sb, Te, I, Xe, Cs, Ba, La, Ce, Pr, and Nd.

The elements resulting from the fissions are unstable and radioactive, with half-lives varying in length in accordance with the element formed.

The absorption of thermal or resonance neutrons by the $U^{238}$ isotope gives rise to the conversion of $U^{238}$ to $U^{239}$ which ultimately decays to transuranic element $94^{239}$. The reaction is as follows:

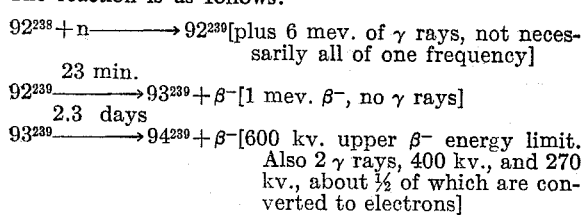

Most of the neutrons arising from the fission process are set free with the very high energy of above one million electron volts average and are therefore not in condition to be utilized efficiently to create new thermal neutron fissions in a fissionable body such as $U^{235}$ when it is mixed with a considerable quantity of $U^{238}$, particularly as in the case of natural uranium. The energies of the fission-released neutrons are so high that most of the latter would tend to be absorbed by the $U^{238}$ nuclei, and yet the energies are not generally high enough for production of fission by more than a small fraction of the neutrons so absorbed. For neutrons of thermal energies, however, the absorption cross section of $U^{235}$, to produce fission, is a great deal more than the simple capture cross section of $U^{238}$; so that under the stated circumstances the fast fission neutrons, after they are created, must be slowed down to thermal energies before they are most effective to produce fresh fission by reaction with additional $U^{235}$ atoms. If a system can be made in which neutrons are slowed down without excessive absorption until they reach thermal energies and then mostly enter into uranium rather than into any other element, a self-sustaining nuclear chain reaction can be obtained, even with natural uranium. Light elements, such as deuterium, beryllium, oxygen or carbon, the latter in the form of graphite, can be used as slowing agents. A special advantage of the use of the light elements mentioned for slowing down fast fission neutrons is that fewer collisions are required for slowing than is the case with heavier elements, and furthermore, the above-enumerated elements have very small neutron capture probabilities, even for thermal neutrons. Hydrogen would be most advantageous were it not for the fact that there may be a relatively high probability of neutron capture by the hydrogen nucleus. Carbon in the form of graphite is a relatively inexpensive, practical, and readily available agent for slowing fast neutrons to thermal energies. Recently, beryllium has been made available in sufficiently large quantities for test as to suitability for use as a neutron slowing material in a system of the type to be described. It has been found to be in every way as satisfactory as carbon. Deuterium while more expensive is especially valuable because of its low absorption of neutrons and its compounds such as deuterium oxide have been used with very effective results.

However, in order for the premise to be fulfilled that the fast fission neutrons be slowed to thermal energies in a slowing medium without too large an absorption in the $U^{238}$ isotope of the uranium, certain types of physical structure should be utilized for the most efficent reproduction of neutrons, since unless precautions are taken to reduce various neutron losses and thus to conserve neutrons for the chain reaction the rate of neutron reproduction may be lowered and in certain cases lowered to a degree such that a self-sustaining system is not attained.

The ratio of the number of fast neutrons produced by the fissions, to the original number of fast neutrons creating the fissions, in a system of infinite size using specific materials is called the reproduction or multiplication factor of the system and is denoted by the symbol K. If K can be made sufficiently greater than unity to create a net gain in neutrons and the system made sufficiently large so that this gain is not entirely lost by leakage from the exterior surface of the system, then a self-sustaining chain reacting system can be built to produce power by nuclear fission of natural uranium. The neutron reproduction ratio, r, in a system of finite size differs from K by the leakage factor and by localized neutron absorbers such as control rods, and must be sufficiently greater than unity to permit the neutron density to rise exponentially. Such a rise will continue indefinitely if not controlled at a desired density corresponding to a desired power output.

The fact that certain materials such as boron have high neutron capture capabilities renders them particularly valuable for controlling the neutronic reaction. By introducing neutron absorbing elements in the form of rods or sheets into the interior of the system, for instance in the slowing material between the uranium masses, the neutron reproduction ratio of the system can be changed in accordance with the amount of absorbing material exposed to the neutrons in the system. A sufficient mass of the absorbing material can readily be inserted into the system to reduce the reproduction ratio of the system to less than unity and thus stop the reaction.

In order to effect a neutron chain reaction that is self-sustaining it is necessary to build the system sufficiently large to produce an effective reproduction ratio greater than unity when the control rods are out of the system. The required size will vary depending upon the K factor of the system, and upon other things. If the reproduction factor K is greater than unity, the number of neutrons present will increase exponentially and indefinitely, provided the structure is made sufficiently large. If, on the contrary, the structure is small, with a large surface-to-volume ratio, there will be a rate of loss of neutrons from the structure by leakage through the outer surfaces, which may overbalance the rate of neutron production inside the structure so that a chain reaction will not be self-sustaining. For each value of the reproduction factor K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K and certain other constants are known, as the ratio of the exterior surface to the volume becomes less as the structure is enlarged.

In the case of a spherical structure employing uranium bodies imbedded in graphite in the geometries disclosed herein and without an external reflector the following formula gives the critical overall radius (R) in feet:

$$K-1=\frac{C}{R^2}$$

where C is a constant that varies slightly with geometry of the lattice and for normal graphite lattices may have a value close to 7.2.

For a rectangular parallelepiped structure rather than spherical, the critical size can be computed from the formula $$K-1=C\left(\frac{1}{a^2}+\frac{1}{b^2}+\frac{1}{c^2}\right)$$

where $a$, $b$, and $c$ are the lengths of the sides in feet. The critical size for a cylindrical structure is given by the formula, irrespective of the shape of the uranium bodies Cylinder height, $h$ ft.
Radius, R ft.

$$\left(K-1=\frac{C}{h^2}1+\frac{.59}{R^2}\right)$$

However, when critical size is attained, by definition no rise in neutron density can be expected. It is therefore necessary to increase the size of the structure beyond the critical size but not to the extent that the period for doubling of the neutron density is too short, as will be explained later. Reactors having a reproduction ratio ($r$) for an operating structure with all control absorbers removed and at the temperature of operation up to about 1.005 are very easy to control. Reproduction ratio should not be permitted to rise above about 1.01 since the reaction will become difficult to control. The size at which this reproduction ratio can be obtained may be computed from modifications of the above formulae for critical size. For example, for spherical active structures the formula $$K-r=\frac{C}{R^2}$$

may be used to find R when K is known and $r$ is somewhat over unity. The same formula will, of course, give $r$ for given structures for which K and R are known.

Critical size may be attained with a somewhat smaller structure by utilizing a neutron reflecting medium surrounding the surface of the active structure. For example, a 2 foot thickness of graphite having low impurity content, completely surrounding a spherical structure is effective in reducing the diameter of the uranium bearing portion by almost 2 feet, resulting in a considerable saving of uranium or uranium compound.

The rate of production of element $94^{239}$ will depend on the rate of neutron absorption by $U^{238}$ and is also proportional to the rate at which fissions occur in $U^{235}$. This in turn is controlled by the thermal neutron density existing in the reactor while operating. Thus for maximum production of element $94^{239}$, it is essential that the thermal neutron density be at a maximum value commensurate with thermal equilibrium.

Considerable heat is generated during a neutronic reaction primarily as the result of the fission process. Following are tables showing more specifically the type of heat generated in the reactor.

SUMMARY BY TYPE

|  | Mev./fission | Percent |
|---|---|---|
| Gamma radiation | 18 | 9 |
| Beta radiation | 16 | 8 |
| Kinetic energy of fission fragments | 160 | 80 |
| Kinetic energy of neutrons | 6 | 3 |
|  | 200 | 100 |

SUMMARY BY LOCALE WHERE HEAT IS GENERATED

|  |  |  |
|---|---|---|
| In uranium | 174 | 87 |
| In moderator | 16 | 8 |
| Outside pile | 10 | 5 |
|  | 200 | 200 |

SUMMARY BY TYPE AND LOCALE

|  | Mev. per fission | Percent in U | Percent in C | Percent Outside |
|---|---|---|---|---|
| Kinetic energy of fission fragments | 159 | 100 |  |  |
| Kinetic energy of neutrons | 6 |  | 99 | 1 |
| Gamma radiation from fission products | 5 | 50 | 45 | 5 |
| Beta radiation from fission products | 6 | 100 |  |  |
| Nuclear affinity of neutrons (gamma radiation) | 12 | 70 | 25 | 5 |

When the system is operated for an extended period of time at a high production output of element $94^{239}$, the large amount of heat thus generated must be removed in order to stabilize the chain reaction. Most of the heat in an operating device is generated as the result of the nuclear fissions taking place in the $U^{235}$ isotope. Thus, the rate of heat generation is largely proportional to the rate at which the fissions take place. In other words, if the rate of generation of neutrons is increased, a greater amount of coolant must be passed through the reactor in order to remove the heat thus generated to avoid damage, particularly at the central portion of the pile, by excessive heat. Thus, the highest obtainable neutron density at which a system can be operated for an extended period of time is limited by the rate at which the generated heat can be removed. That is to say, the maximum power output of a system is limited by the capacity of the cooling system. With the device forming the subject matter of the present invention the uranium itself is withdrawn from the reactor and cooled before it is returned. This is possible because of the fact that the uranium is in fluid form.

The present invention may take the form of a $UF_6$ graphite reactor where the graphite serves as the neutron slowing agent, or heavy water may be used instead of graphite. Certain combinations of graphite and heavy water may be desired to slow down the fast neutrons. Instead of $UF_6$ alone, combinations of $UF_6$ and metallic uranium may be preferred as sources of the uranium for the chain reaction. Various such arrangements are disclosed herein as specific embodiments of the invention.

The fission fragments in the $UF_6$ are extremely radioactive and for that reason the entire system including the circulating circuit should be shielded to protect operating personnel from the biological hazards presented by such radiations.

While the method of extracting the fission products and element 94$^{239}$ from the bombarded uranium taken from the reactor forms no part of the present invention, the fission products and element 94$^{239}$ are removable and when removed are extremely useful. The radioactive fission products are valuable for use as radiation sources, many having long half lives with high energy gamma radiation sufficient for radiography of even heavy metal castings. In addition, some of the fission products are useful as radioactive tracers in biological and physiological research.

Element 94$^{239}$ is exceptionally useful because it is fissionable by slow neutrons in the same manner as the uranium isotope 92$^{235}$ contained in natural uranium. The separation of 92$^{235}$ from 92$^{238}$ in natural uranium is extremely difficult since both are isotopes of the same element and these isotopes vary only a small percentage in comparative weight. Element 94$^{239}$ on the other hand, is a different element from uranium, having different chemical properties than uranium, and therefore can be chemically separated from uranium. After separation, for example, element 94$^{239}$ can be added to natural uranium to supplement the 92$^{235}$ content, thus increasing the amount of fissionable material in the uranium. This enriched uranium can then be used in neutronic systems making it possible to provide more cooling facilities, for example, than can be used in a system of the same geometry employing only natural uranium. Thus, an enriched neutronic system may provide a greater power output than would be possible in a natural uranium system having the same geometry.

One advantage of the liquid UF$_6$ as the source of uranium is the fact that it can readily be withdrawn from the plant for cooling and for extraction of elements 93, 94 and the fission products without stopping the reaction. Thus the UF$_6$ can be cooled prior to its introduction into the lattice pile and serve as the coolant for the system, eliminating the necessity of providing a separate cooling system.

Therefore, a principal object of the present invention is to provide a novel continuously operating and efficient device of the kind described requiring no interruption of the reaction for the removal of formed elements 93 and 94 and the fission products from the device.

Another object of the invention is to provide a system comprising a fissionable material such as uranium in fluid form and a slowing medium so that neutron losses are reduced to such an extent that a controllable self-sustaining neutron chain fission reaction is obtained therein, with resultant regulated production of neutrons, liberation of power in the form of heat and other forms, and the production of radioactive fission products and new elements both radioactive and stable produced by the absorption of neutrons.

Another object is to provide a novel controllable nuclear self-sustaining chain reaction system.

Another object is to provide a novel nuclear self-sustaining chain reaction system including uranium in liquid form in which said liquid is circulated independently of mechanical means.

Another object is to provide a novel nuclear self-sustaining chain reaction system in which the effect on the K factor of the impurities formed by the reaction is reduced.

Other objects and advantages will be apparent from the following description taken in conjunction with the accompanying drawings, in which:

FIG. 7 is a fragmentary diagrammatic sectional view taken on the line 7—7 of FIG. 8 showing another modified form of the present invention wherein a UF$_6$-heavy water system forms the core of the power device surrounded by a UF$_6$-graphite system;

FIG. 8 is a vertical sectional view taken on the line 8—8 of FIG. 7;

FIG. 9 is a horizontal sectional view taken on the line 9—9 of FIG. 8;

Figure 1:
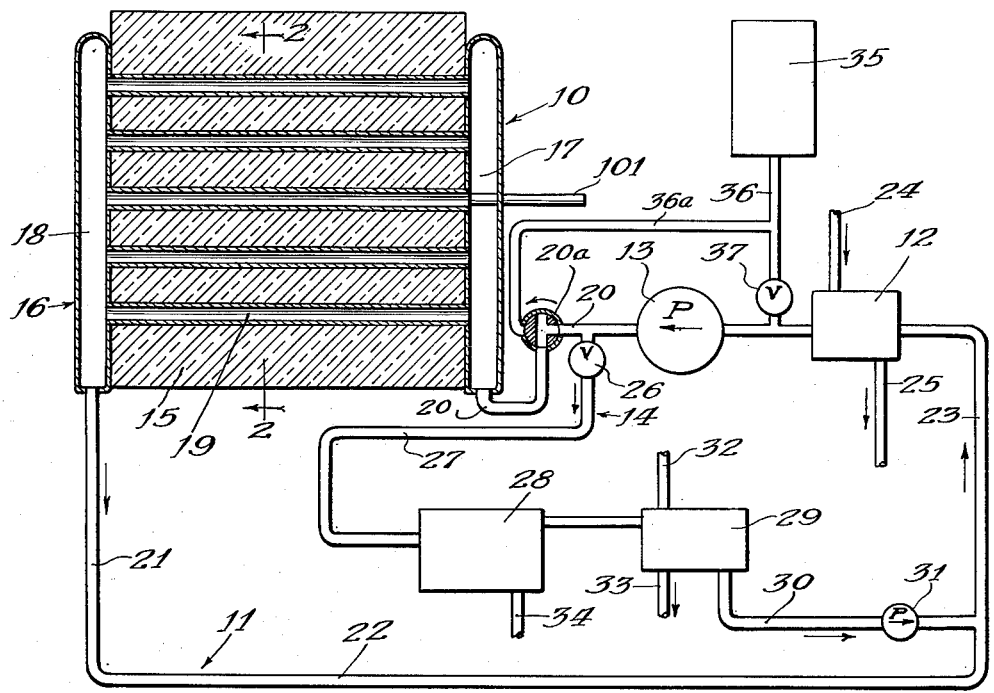
FIG. 1 is a diagrammatic view showing a complete UF$_6$ power plant.

The power plant shown in FIG. 1 consists essentially of a power unit known as a lattice pile generally indicated at 10, a system of circulating pipes generally indicated at 11, a heat exchanger 12, a circulating pump 13, and a bleed-off circuit indicated at 14. The pile 10 comprises briefly a graphite or heavy water matrix 15 and a generating unit 16 including headers 17 and 18 interconnected by a plurality of tubes 19 imbedded in the graphite matrix 15.

The UF$^6$ is circulated through the system by means of a pump 13 and passes from the pump through pipe 20, two-way valve 20a, into header 17 of the generator 16, thence through the tubes 19, to the discharge header 18. The UF$_6$ leaves the discharge header 18 through pipes 21, 22, and 23, passing into the heat exchanger 12 and then is returned to the pump 13 for recirculation. The heat exchanger 12 is cooled by water or other suitable coolant entering the heat exchanger through pipe 24 and leaving through pipe 25.

During normal operation of the power plant elements 93 and 94 and fission products are produced by the chain reaction of the uranium in the UF$_6$ as indicated above, and a portion of the UF$_6$ containing these elements and products may be removed from the system through the bleed-off circuit 14. Some suitable valve 26 controls the amount of UF$_6$ withdrawn from the system and this is passed through pipe 27 into an evaporator 28. The more volatile UF$_6$ vaporizes and passes into a condenser 29, where it is liquefied and then is drawn through a pipe 30 by a pump 31 and returned into the main power plant system. The condenser 29 is provided with a suitable coolant entering the condenser through pipe 32 and leaving through pipe 33.

In the evaporator 28 such of the fission products and elements 93 and 94 as are present in relatively non-volatile form are concentrated in the bottom, along with a portion of the UF$_6$. This material is withdrawn by some suitable means, such as through a pipe 34, and then elements 93 and 94 are separated from the UF$_6$ and the fission products by further processing outside the power plant.

Inasmuch as some of the UF$_6$ is bled from the power plant system, some means must be provided to replace the amount withdrawn. In FIG. 1, a container 35 adapted to contain a supply of $UF_6$ is shown connected to the power plant system by means of a pipe 36 containing a valve 37 regulating the flow of $UF_6$ from the container 35.

Instead of returning to the system some of the $UF_6$ bled-off, it may be preferred to remove all of the $UF_6$ bled-off and merely replenish the amount thus removed with fresh liquid from the reservoir 35.

In the power plant shown in FIG. 1, the liquid $UF_6$ is circulated through the graphite lattice pile at a rate sufficient to remove the heat generated in the pile during the chain reaction. As shown, pumps are utilized for circulating the liquid $UF_6$, though it is recognized that other suitable means may be used, such, for example, as means employing a thermal circulating device.

Figure 2:
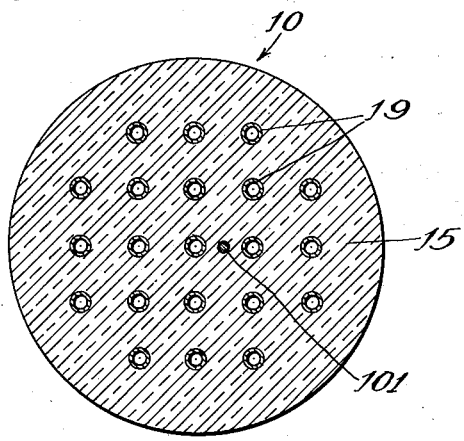
FIG. 2 is a vertical sectional view through the pile taken on the line 2—2 of FIG. 1.
Figure 3:
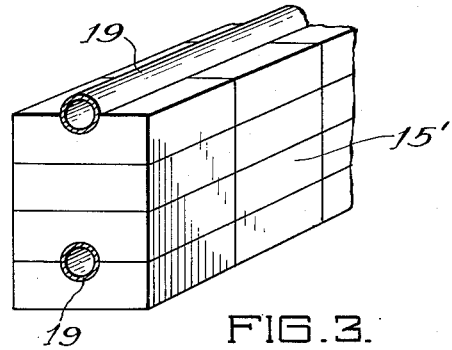
FIG. 3 is an enlarged fragmentary perspective view showing the manner in which the graphite blocks and uranium tubes are arranged when making up the pile shown only diagrammatically in FIGS. 1 and 2.

As shown, the tubes 19 passing through the graphite matrix 15 are made of uranium, the arrangement of the tubes in the graphite constituting a lattice structure as shown in FIG. 2. One arrangement for constructing a lattice structure employing graphite is illustrated in FIG. 3 where the graphite is shown in the form of blocks indicated at 15'. If desired, uranium tubes with a thin lining of nickel or some other metal which does not undergo corrosion by $UF_6$ may also be employed in the lattice pile, it being understood that said other metal must have relatively low neutron absorption.

If heavy water is used instead of graphite, then aluminum tubes are also suitable since greater neutron absorption losses can be tolerated due to the lower capture cross-section of the heavy water and its much greater effectiveness as a neutron slowing down agent. It is recognized that in the heavy water lattice pile certain other materials can also be used for the tubes, for example, such as thin nickel-lined uranium, beryllium, or beryllium alloys, and magnesium or magnesium alloys, provided the alloys are such as have relatively low neutron absorption. These materials, except for uranium, have a low probability of absorbing neutrons and are, therefore, suitable for the tubes. The uranium emits more neutrons than it absorbs so that it is a suitable material for the tubes.

Figure 4:
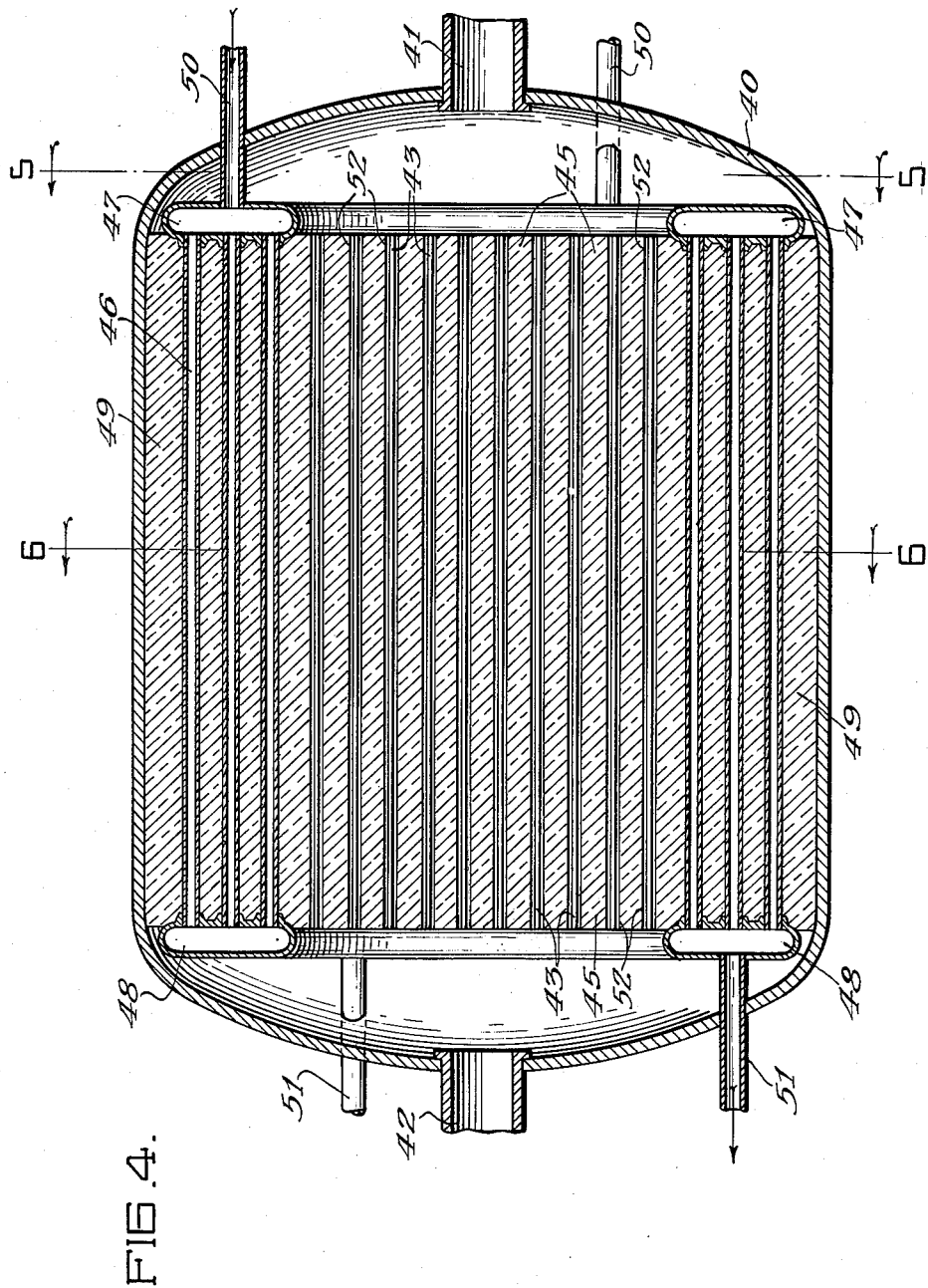
FIG. 4 is a more or less diagrammatic sectional view taken on the line 4—4 of FIG. 5 showing a modified form of the invention, the power unit constituting a core of uranium and graphite surrounded by a UF$_6$ graphite system.
Figure 6:
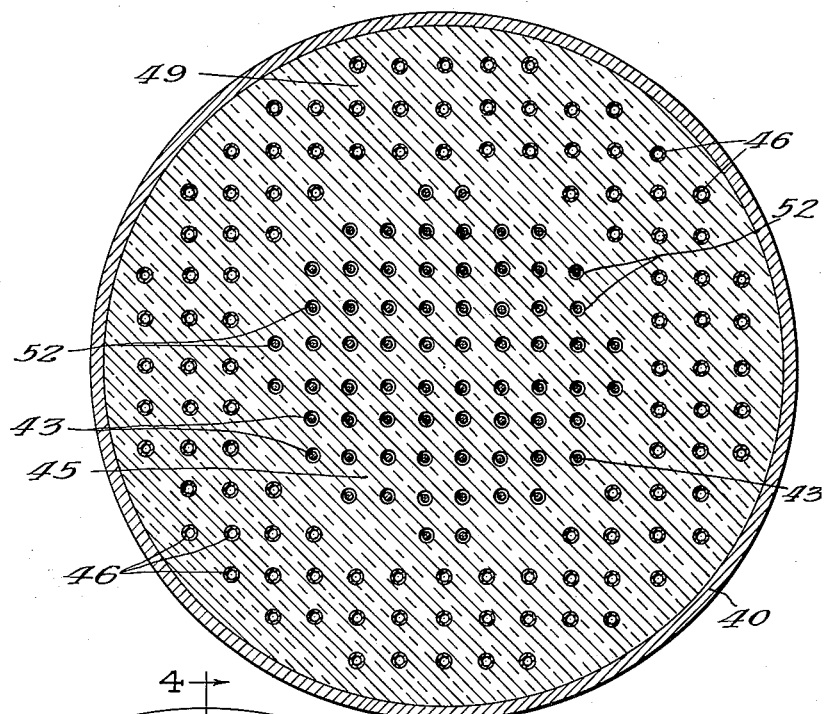
FIG. 6 is a vertical sectional view taken on the line 6—6 of FIG. 4.
Figure 5:
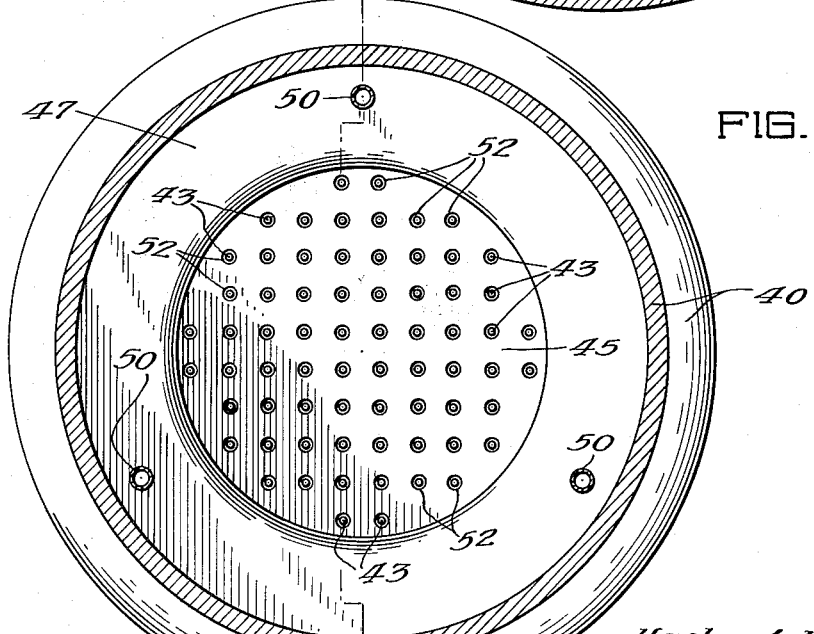
FIG. 5 is a vertical sectional view taken on the line 5—5 of FIG. 4.

In FIG. 4 is illustrated a modified form of neutronic reactor which may be employed in the system of FIG. 1. In the reactor of FIG. 4, $UF_6$ is employed as the fissionable material only in the peripheral portion of the reactor. The reactor is enclosed in a sealed shell 40 having an inlet 41 at one end and an outlet 42 at the other end for circulation of helium. The central portion or core of the reactor comprises uranium rods 43 in a matrix of graphite 45. The helium flows through this core portion through annular passages surrounding the rods 43. On the periphery of the reactor, aluminum tubes 46 extend through the graphite matrix 49. The tubes 46 terminate in ring-shaped headers 47 and 48. An inlet tube 50 is connected to the inlet header 47, and an outlet tube 51 is connected to the outlet header 48. $UF_6$ is introduced through the inlet tube 50 and is flown through the tubes 46. It will thus be seen that in the core portion of the reactor, the fissionable material is in the form of metallic uranium, and is cooled by the helium coolant; on the other hand, on the peripheral portion, the $UF_6$ serves both as the fissionable material, and as the coolant.

The relative sizes of the central core and the outer $UF_6$ system surrounding the core will depend upon such considerations as the availability of materials, the desired overall size, the required power output, and the like. Whatever this relationship may be, it is, of course, essential that the overall size of the entire unit including both the central core and the outer $UF_6$ system be somewhat greater than the critical size required to sustain the chain reaction. The outer $UF_6$-graphite system also serves as a reflector for the neutrons emitted by the core of uranium rods and further as the medium from which element 94 can be extracted conveniently as it is produced in the plant.

Referring to FIGURES 7 to 9 inclusive, another embodiment of the present invention is shown. Here a combination $UF_6$-heavy water and $UF_6$-graphite pile is illustrated in place of the pile 10 shown in FIGURE 1. The heavy water should be substantially pure. Very little light water can be tolerated because of its relatively high absorption cross-section for thermal neutrons. In this form of the invention a void 53 in the graphite is provided in the center of the lattice pile. As shown the void is spherical in shape and is filled with heavy water 54. This void is surrounded by a matrix of graphite indicated at 55. Imbedded in the graphite and passing through the heavy water in the void 53 are a plurality of aluminum tubes 56. The $UF_6$ passes through the aluminum tubes 56 and serves as the source of uranium for the chain reaction, the graphite 55 serving as the slowing down agent in the region outside the void 53 and the heavy water 54 serving to slow down the fast neutrons inside the center of the pile. Here the $UF_6$-heavy water system in the center serves as the core. A steel shell 100 surrounds the pile.

Heavy water due to its low capture cross-section for thermal neutrons, is more efficient in slowing down the fast neutrons than is graphite. For this reason a system employing $UF_6$ as the only source of uranium and heavy water as a slowing down agent is very desirable. Accordingly, a combination unit such as that shown in FIGURE 7 has a decided advantage over a system employing graphite as the only slowing agent. The required size for a pile of this sort to effect the continuous neutron chain reaction is smaller than in the case whereing graphite alone is used as the slowing down agent.

Referring again to the plant shown in FIGURE 1, the following figures will give the approximate proportions in sizes and weights of the various elements making up the lattice pile:

| | |
|---|---:|
| Inside diameter of tubes containing $UF_6$_____cm__ | 4 |
| Wall thickness of uranium metal tubes_____cm__ | .18 |
| Distance between tubes (center to center)___cm__ | 21.6 |
| Length of tubes in the reactor_____cm__ | 830 |
| Number of tubes_____ | 1700 |
| Reproduction factor_____ | 1.029 |

The output of the plant is limited chiefly by the rate at which the heat produced can be removed. This is explained by the fact that the $UF_6$ must not be permitted to boil as otherwise the chain reaction will stop. The workable operating range of the $UF_6$ then is between the temperatures at which it enters and leaves the pile, unless the boiling point is reached. The $UF_6$ entering the pile should be kept at a temperature sufficiently low but above the triple point, and under a pressure sufficient to maintain it in liquid state, and the speed of circulation should be maintained sufficiently high, so that the temperature rise of the $UF_6$ in the pile will not be sufficient to cause boiling.

For a plant of the sort shown in FIGURE 1 using uranium tubes producing two hundred grams of element 94 per day in the power plant, the power dissipated must be approximately $2 \times 10^5$ kw. This means $3 \times 10^4$ cal. per second in each tube. Since about one half of the heat is generated in the liquid $UF_6$, and since the metal tubes are not thick, the heat transfer problems are very simple. In this type of system only about one hundred grams of element 94 per day is produced in the $UF_6$, the additional one hundred grams being produced in the uranium tubes making up the core. The melting point of $UF_6$ is $64.5 \pm 0.5°$ C. at a pressure of 1.53 atmospheres (22.5 lbs. per sq. in.) and at 95° C. it has a vapor pressure of 3.6 atmospheres. Since it has a specific heat of about 50 cal. per mol per degree, the $UF_6$ must be pumped through the tubes 19 and the lattice pile 10 at a velocity of about 1.5 meters per second.

One example of a system employing $UF_6$ as the source of uranium and heavy water as the slowing down agent may have the following specification:

| | |
|---|---|
| Inside diameter of tubes containing $UF_6$ _____cm__ | 8 |
| Distance between tubes (center to center) ___cm__ | 24 |
| Wall thickness of tubes of duralumin_____cm__ | .22 |
| Reproduction factor_____ | 1.082 |
| Reactor cylinder length_____m__ | 3.31 |
| Reactor cylinder diameter_____m__ | 3.6 |
| Number of tubes_____ | 223 |

The power output of such a plant depends, of course, upon the rate of cooling as previously explained, but if conditions are correct it would be approximately $10^5$ kilowatts.

An example of a workable system employing $UF_6$ in heavy water as the core or seed, surrounded by a lattice of $UF_6$ in uranium tubes imbedded in graphite, would have the following specifications:

| | |
|---|---|
| Inside diameter of tubes containing $UF_6$ _____cm__ | 8 |
| Distance between tubes (center to center) ___cm__ | 24 |
| Wall thickness of duralumin tubes_____cm__ | .22 |
| Wall thickness of uranium metal tubes_____cm__ | .18 |
| Reproduction factor of core_____ | 1.082 |
| Diameter of sphere for the $UF_6$-heavy water core m__ | 2.6 |
| Diameter of outer shell (exclusive of shields)__m__ | 5 |
| Overall length of shell (exclusive of shield)___m__ | 4.6 |
| Number of tubes (total)_____ | 435 |
| Number of tubes in core_____ | 118 |
| Number of tubes in outer system_____ | 317 |

There are two workable $UF_6$ lattices which may be defined as pure systems. $UF_6$ passing through uranium tubes imbedded in a matrix of graphite arranged in the proper relationship will produce the neutron chain reaction. $UF_6$ passing through aluminum tubes surrounded by heavy water in the proper relationship also produces a chain reaction.

Where a seed or core is employed there are two combinations effective in producing a chain reaction. One satisfactory arrangement employs $UF_6$ passing through aluminum tubes surrounded by heavy water as a core or seed, surrounded by a system employing $UF_6$ passing through aluminum tubes imbedded in graphite. Another workable combination utilizes uranium rods imbedded in graphite as the core or seed, surrounded by a system employing $UF_6$ passing through aluminum tubes embedded in graphite. In the second arrangement the core requires a separate cooling system, and some suitable gas such as air or helium is a satisfactory coolant. Helium is shown for illustrative purposes and is preferably placed under pressure greater than that of the $UF_6$ so that if any leaks occur in the $UF_6$ portion of the arrangement shown in FIG. 4, the helium will enter the $UF_6$ system rather than the converse.

If uranium tubes are used thin coatings such as aluminum over the uranium may be necessary to prevent corrosion due to chemical reactions between the $UF_6$ and the uranium metal in the presence of high temperatures and high neutron densities.

Figure 10:
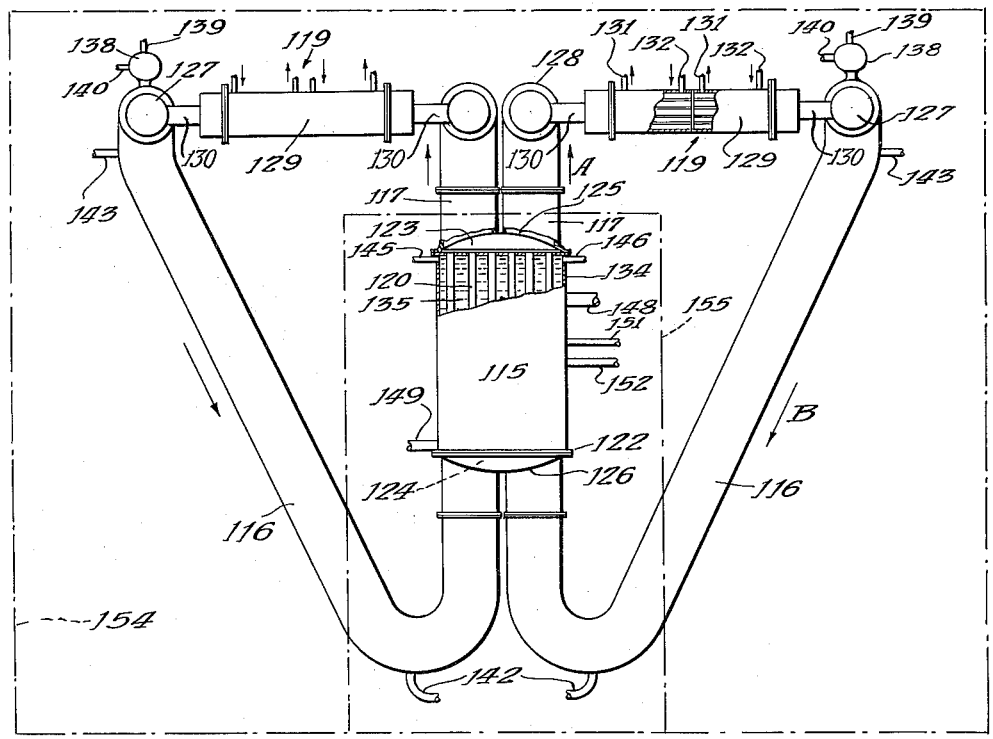
FIG. 10 is a diagrammatic view in elevation of another embodiment of the present invention.
Figure 11:
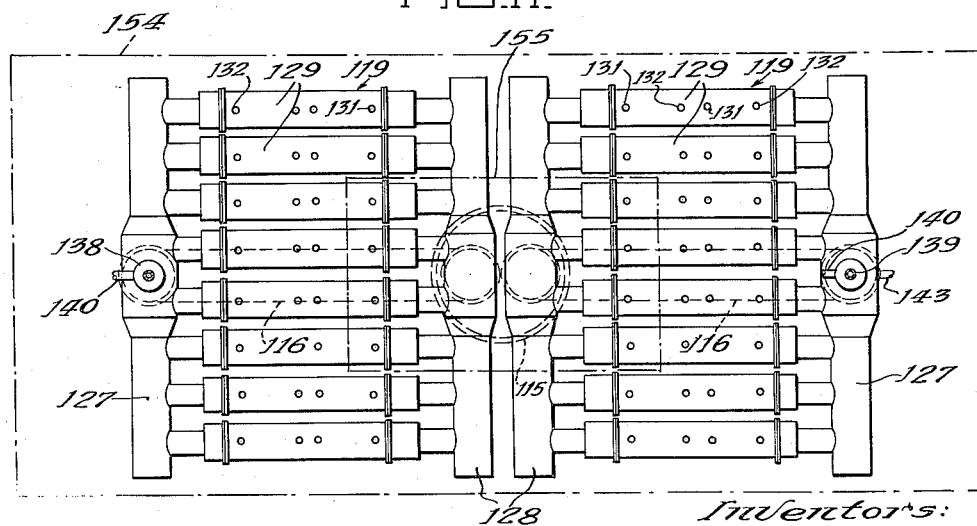
FIG. 11 is a diagrammatic view in plan of the system shown in FIG. 10.

In FIGS. 10 and 11 we have diagrammatically shown a chain reacting system in which $UF_6$ is continuously circulated by thermosyphon through tubes in a reaction tank filled with $D_2O$, and through nearby heat exchanger devices and connecting conduits.

A reaction tank 115 is connected by inlet pipes or conduits 116 and outlet pipes or conduits 117 to two duplicate similarly disposed banks of heat exchangers each generally designated 119, preferably located above the tank 115. In the tank 115 are tubes 120 disposed between and supported by upper and lower header plates 121 and 122, respectively. A space 123 is formed between an upper head 125 and the header plate 121, and a space 124 between a lower head 126 and the header plate 122.

Each heat exchanger bank 119 includes two horizontally disposed headers 127 and 128, supporting between them and connected by pipe segments 130 to a plurality of horizontally disposed heat exchangers 129. The headers 127 and 128 are connected to pipes 116 and 117, respectively. Each heat exchanger 129 preferably has two sets of coolant pipes, outlets and inlets therefor being indicated at 131 and 132, respectively.

The pipes 120, the outlet pipes 117, the heat exchanger banks 119, and the inlet pipes 116 form duplicate continuous passageways in which is $UF_6$, designated 134. Within the tank 115 and surrounding the pipes 120 is $D_2O$, indicated by 135. The pipes 116, 117, and the heat exchanger banks 119 are of stainless steel, or other suitable material. Pipes 120 are of aluminum. Erosion, corrosion, and neutron capture cross-section are important factors in selecting materials.

To each header 127 is connected a suitable chamber 138 having an outlet 139 and an inlet 140. The chambers 138 serve as expansion and pressure chambers for the $UF_6$, and also as collecting stations for xenon and other gaseous fission products generated or developed as a result of the reaction. Helium under a desired pressure is introduced into the chambers 138 through inlets 140 to maintain the $UF_6$ at a pressure for remaining a liquid at selected operating temperatures. Helium and the gaseous fission products are swept out through outlets 139 as desired.

For bleeding $UF_6$ from the system there are provided outlet connections 142, and for introducing additional $UF_6$ into the system there are provided inlet connections 143.

Inlet connection 145 and outlet connection 146 are located in the side of the tank 115 near the header plate 121 above the operating level of the $D_2O$. Helium under pressure sufficient to maintain the boiling point of the $D_2O$ above 130° C. is introduced through the inlet 145 into the space above the $D_2O$ to dilute generated or formed deuterium and oxygen to prevent possible explosion, and, together with such deuterium and oxygen and any other formed gases, is exhausted therefrom through outlet connection 146. Inlet pipe 148 and outlet pipe 149 are provided for admitting more $D_2O$ into and for draining $D_2O$ from the tank 115, respectively.

A control rod 151 and a safety rod 152 of cadmium or other material of high neutron absorption cross-section, extend into the tank 115 for selected longitudinal movements into and out of the tank 115. The rods 151 and 152 may be of the construction of the rods shown and described in the aforementioned co-pending application of Fermi and Szilard, Serial Number 658,904, filed December 19, 1944, now Patent 2,708,656, dated May 17, 1955. Suitable shielding is provided for the system which may include an overall wall 154 of concrete and lead or the like, and additional shielding structure 155 around the reaction tank 115.

In an illustrative embodiment of the system of FIGURES 10 and 11, for a power output of 600,000 kw. the reaction tank 115 is of cylindrical configuration, approximately 13 feet (400 cm.) in diameter and 20 feet (600 cm.) high. There are 116 vertical aluminum tubes 120, which are 20 cm. inside diameter with a 2 mm. wall thickness. About 63 tons of $D_2O$ are in the tank 115. The inlet pipes 116 and outlet pipes 117 are 5½ feet in diameter. The longitudinal axes of the headers 127 and 128 are 32 feet apart, and the longitudinal axes of the two headers 128 are 6 feet apart. Eight heat exchangers 129 of standard construction are included in each bank 119. Each heat exchanger 129 is 16 feet in length and 4 feet in diameter, and includes two sets of standard coolant receiving pipes. Connecting pipe segments 130 are 2 feet in diameter. The distance between the longitudinal axes of the heat exchangers 129 is 5 feet. Flow of $UF_6$ in inlet pipes 116 is 2.8 feet per second, the pressure differential in the system being about 450 pounds per square foot. The height of the system from the bottom of the tank 115 is about 32 feet. The amount of $UF_6$ external to the tank 115 is about 570 tons; that in the tubes 120 is 84 tons and in the two tank heads 125 and 126 is 32 tons. Hence, the total amount of $UF_6$ is 686 tons, of which about 465 tons are uranium. This high ratio of $UF_6$ outside the tank 115 to that inside is effective in reducing the effect on factor K of impurities, such as xenon, formed by the reaction in the $UF_6$, since only the impurities in the tank 115 proper reduce the factor K.

The $UF_6$ leaves the reaction tank 115 at a temperature of about 130° C. and is cooled in the heat exchangers 129 to about 75° C., at which temperature the $UF_6$ returns to the tank 115. Such temperatures allow operation at 150 lbs. per square inch with no danger of vaporization. Cooling water enters heat exchangers 129 at 15° C. at 82,000 g.p.m. Density differentials arising from the afore indicated temperature changes of the $UF_6$ effect circulation of $UF_6$ in the system, flow being in the direction indicated by arrows A and B.

During the operation of the system, $UF_6$ is drawn off from time to time, or continuously, at outlet connections 142 for the recovery of the formed $94^{239}$ and the fission products. At such time an equal amount of $UF_6$ is added at inlet connections 143. Carbon and heavy water have been discussed as two neutron slowing agents. Many liquid or solid forms of deuterium, beryllium, carbon and oxygen are suitable as neutron slowing agents, the only requirements being that such agents be relatively free from neutron absorbing substances whether in the free or combined state.

Any one of the systems illustrated can be controlled by the insertion of rods 101 (FIGS. 1 and 2), of high neutron absorption characteristics; the particular details of which form no part of the present invention. One or more cadmium or boron steel rods or bars would be suitable for this purpose. It may be desirable to control the system illustrated in FIGURE 1 by pumping in or out of the pile portions of the $UF_6$. This varies the amount of uranium in the pile and thus will control the neutron densities. Liquid thus removed from the pile is pumped into the reservoir 35 through the two-way valve 20a, turned to direct the fluid through the pipes 36a and 36.

When the system is placed into operation, the control rod is withdrawn to permit the neutron density to rise exponentially to the value desired. The control rod is then moved back into the system to the position where the reproduction ratio is approximately equal to unity and is maintained in such position, thereby keeping the neutron density at the selected value. To further increase neutron density, the control rod is again withdrawn; to decrease neutron density, it is moved deeper into the system. Hence, the control rod is not a throttle in respect to neutron density, but is effective to change the reproduction ratio $r$ of the system as desired, since it is a controllable impurity.

An advantage of the system employing $UF_6$ as the source of uranium is that as the rare isotope $U^{235}$ is used up in the fission process and the system becomes poisoned by the fission products, a portion of the fission products is removed while a sufficient portion of the element 94 being extracted from the system can be injected back into the main circuit to enrich the system with fissionable material. Where the system is operated primarily for the production of energy, it may be preferred to thus return at least the major portion of the extracted element 94 into the system. On the other hand, where the primary purpose is to produce element 94, fresh $UF_6$ containing the $U^{235}$ isotope in concentrations at least as high as that of normal or natural uranium may preferably be introduced into the system to replenish the $U^{235}$ isotope as it is used up during the fission process. There is, however, an optimum amount of element 94 that should be left in the system to give the best results, even where the primary purpose of the system is to produce element 94. This amount can be determined empirically with an operating unit.

One of the chief advantages of using $UF_6$ as the source of uranium in a power plant of the type described herein where a neutron chain reaction is produced is that the removal of elements 93 and 94 and the fission products from the $UF_6$ is relatively simple. There is no problem in removing the $UF_6$ from the lattice pile because this can be done by merely bleeding off the liquid as illustrated in FIGURE 1. If small traces of elements that form non-volatile fluorides are present in the $UF_6$ they can be readily isolated by a simple distillation process. Since element 94 readily forms a fluoride which is non volatile, a simple distillation process can be employed to evaporate the $UF_6$ away from element 94 and the fission products. The final removal of element 94 from the fission products can be performed as a separate operation away from the power plant system.

$UF_6$ is a colorless or white solid that sublimes under atmospheric pressure. It has a vapor pressure of one atmosphere at 56.4° C. and liquefies at 64.5±0.5° C. in a closed system where its vapor pressure is 1.53 atmospheres. The density of the liquid is 3.67 gm./cm.$^3$ and that of the solid is 4.68 gm./cm.$^3$. The specific heat of the liquid is roughly half that for water per unit volume. The heat of vaporization from the solid state is 11.2 kcal. per mol. $UF_6$ reacts with most metals to form a very thin metal fluoride coating thereon of relatively great mechanical strength, which coating serves to protect the underlying metal from further attack.

The various embodiments described herein demonstrate application of the present invention as a plant adapted to produce element 94 and as a plant for the production of power in the form of heat energy. Where the latter is the primary purpose of the system, the heat output from the heat-exchangers, augmented if desired by passing coolant from the lattice pile proper through suitable heat exchangers, may be employed in conventional manner or otherwise, such as to drive suitable heat engines or to otherwise utilize or convert the thermal energy into more readily utilizable power, such as electrical power. Both purposes may be combined if desired.

The isotope $93^{239}$ is a radioactive isotope produced by the beta decay of the uranium isotope $U^{239}$ resulting from the absorption of resonance and thermal neutrons by the isotope $U^{238}$ in the $UF_6$. The isotope undergoes beta decay to the isotope $94^{239}$, the half-life being 2.3 days. In this instance the $UF_6$ serves as an abundant source of neutrons for the production of the isotope $94^{239}$. It is recognized that other radioactive isotopes can be produced by the bombardment with neutrons of elements other than uranium, such as thorium$^{232}$ which by the addition of a neutron is converted into thorium$^{233}$, which in turn ultimately decays to the fissionable uranium isotope $U^{233}$. A $UF_6$ system in such an instance would be useful because the $UF_6$ would serve as a source of neutrons and the element to be bombarded may be dispersed in the liquid $UF_6$ or it may be inserted in suitable cavities formed in the graphite. In any event the target element would be disposed in the path of the neutrons.

In a $UF_6$ system designed to furnish neutrons for the production of radioactive isotopes generally, it is preferred that certain quantities of the liquid $UF_6$ be removed from the system for the purpose of extracting elements 93, 94, fission products, and any other radioactive isotopes produced by the reaction. Thus the required purity of the $UF_6$ is maintained and by adding fresh $UF_6$, as from the reservoir 35, the $U^{235}$ content is replenished to perpetuate the reaction and to furnish a continuous supply of neutrons.

Figure 12:
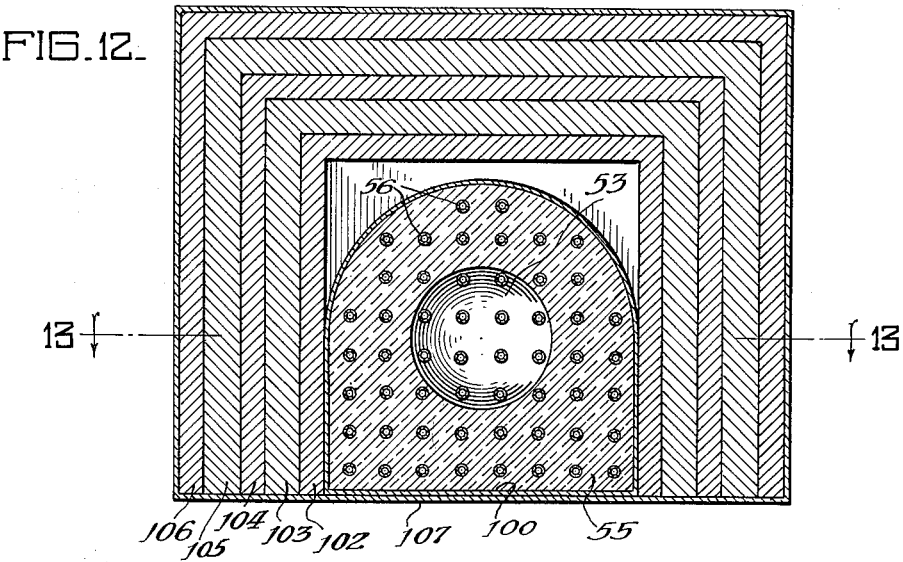
FIG. 12 is a view showing the UF$_6$-heavy water system illustrated in FIG. 7 provided with suitable shielding.
Figure 13:
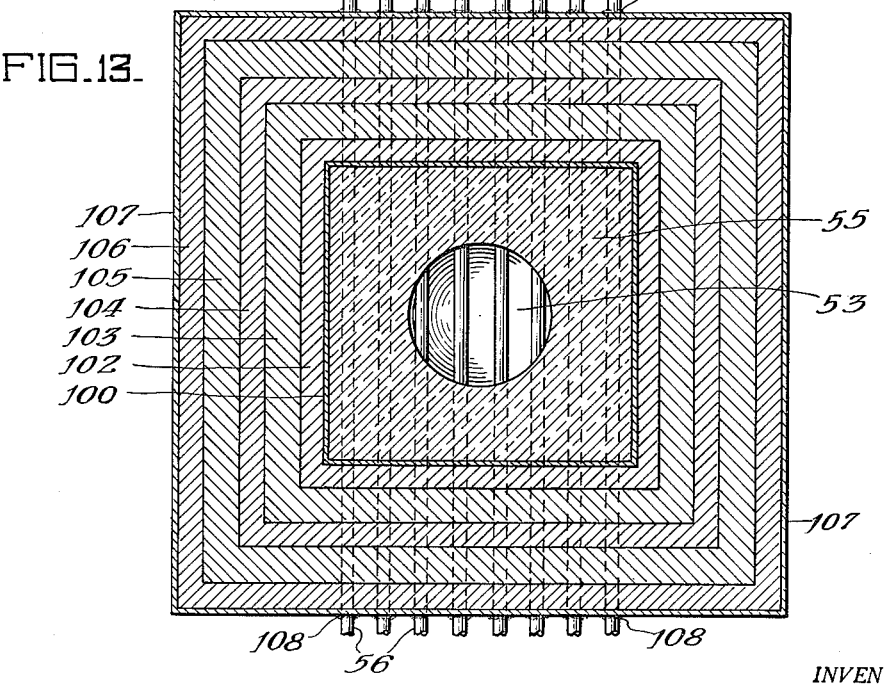
FIG. 13 is a fragmentary horizontal sectional view taken on the line 13—13 of FIG. 12.

Suitable shielding around any of the reactors shown herein is required to absorb substantially all of the slow neutrons and gamma rays emitted from the reactor. One suitable type of shield is shown in FIGS. 12 and 13. For the purpose of illustration, the form of the invention shown in FIG. 7 has been selected to demonstrate the shield arrangement. The shield comprises alternate layers of iron and paraffin-impregnated wood 102, 103, 104, and 106. The iron portions 102, 104, and 106 are approximately one foot in thickness each, and they extend on all four upright sides and across the top of the shell 100. The paraffin-impregnated portions 103 and 105 are approximately one and one-half feet in thickness each, and are sandwiched in between the iron portions as shown. Cooling pipes (not shown) may be provided in the iron portion 102, the wood portion 103, and perhaps in the portions 104 and 105, and a suitable coolant such as water may be circulated through these pipes to cool the hot portion of the shield. The heat thus extracted by the coolant may be utilized as energy. The entire system is enclosed in a shell 107 which surrounds all six sides of the system.

The function of the iron portions 102, 104, and 106 is to absorb slow neutrons and gamma rays which are emitted from the pile. Some fast neutrons will not be absorbed by the iron portions 102 and 104, and the paraffin-impregnated wood portions 103 and 105 serve the purpose of slowing down these fast neutrons so that they in turn can be absorbed by the next layer of iron, that is, portions 104 or 106. Gamma rays are produced in the paraffin-impregnated wood portions 103 and 105 as a result of the capture of the neutrons, but these are absorbed in the iron portions 104 or 106.

The outer shell 107 as illustrated is made of aluminum and the aluminum tubes 56 extending through the pile pass through the opposite ends of the shell 107 (Fig. 13) and are suitably welded to the shell as indicated at 108.

In FIGS. 12 and 13 of the drawings, the central void 53 is shown with shading to bring out the curvature of the spherical surface, and for purposes of clarity the heavy water has not been indicated in these two views. It is to be understood, however, that this central void is filled with heavy water and that the reactor inside the shield corresponds with that shown in FIG. 7. It is also to be understood that the particular shield described in FIGS. 12 and 13 is for illustration purposes only and that there are other forms of shields which are equally satisfactory. Of course, the reactors shown in FIGS. 1 and 4 will also require shields, but for purposes of clarity these shields have been omitted in these particular figures.

It is, of course, recognized that the uranium and/or the $UF_6$ may be enriched with additional fissionable material prior to its employment in the plant. This can be done, for example, by initially adding element $94^{239}$, $U^{233}$ or other fissionable element to the $UF_6$, or by employing $UF_6$ which has been previously enriched with respect to its normal concentration of $U^{235}$.

For purposes of disclosure specific embodiments of the present invention have been described. It is, of course, recognized that many modifications may be made without departing from the intended scope of the invention, the invention being particularly set forth in the claims which follow.

What is claimed is:

1. In a lattice system for the production of power by the chain reaction of uranium, a neutron slowing agent, a fluid circulating system having a portion thereof surrounded by the said slowing agent, liquid uranium hexafluoride in said circulating system in sufficient quantities to furnish $U^{235}$ to support the chain reaction, and means for circulating the uranium hexafluoride through the circulating system.

2. In a lattice system for the production of power by the chain reaction of uranium, a neutron slowing agent, a fluid circulating system having a portion thereof passing through the neutron slowing agent, liquid uranium hexafluoride in said circulating system in sufficient quantities to furnish $U^{235}$ to support the chain reaction, a heat exchanger in the circulating system having cooling means therefor, and means for circulating the uranium hexafluoride through the circulating system and in heat exchange relationship with the coolant in the heat exchanger so as to control the temperature of the uranium hexafluoride.

3. A device for effecting a controlled nuclear chain reaction comprising a lattice system of graphite with uranium pipes imbedded in the graphite and disposed in spaced relationship throughout the graphite, a fluid circulating system including the imbedded pipes and a heat exchanger, a charge of liquid uranium hexafluoride in the circulating system in a sufficient quantity to furnish $U^{235}$ to support the chain reaction, and means for circulating the uranium hexafluoride through the circulating system.

4. A device for effecting a controlled nuclear chain reaction comprising a lattice system of graphite with pipes imbedded in the graphite and disposed in spaced relationship throughout the graphite, a fluid circulating system including the imbedded pipes and a heat exchanger, a charge of liquid uranium hexafluoride in the circulating system in a sufficient quantity to furnish $U^{235}$ to support the chain reaction, means for circulating the uranium hexafluoride through the circulating system, and means for bleeding off some of the uranium hexafluoride for extraction of elements 93, 94 and fission products resulting from the chain reaction.

5. A device for effecting a controlled nuclear chain reaction comprising a lattice system of graphite with pipes imbedded in the graphite and disposed in spaced relationship throughout the graphite, a fluid circulating system including the imbedded pipes and a heat exchanger, a charge of liquid uranium hexafluoride in the circulating system in a sufficient quantity to furnish uranium having a $U^{235}$ content to support the chain reaction, means for circulating the uranium hexafluoride through the circulating system, a bypass circuit for removing some of the uranium hexafluoride and including an evaporator for separating uranium hexafluoride from elements 93 and 94 and the fission products, and means for removing elements 93 and 94 and the fission products from the evaporator.

6. In a continuously operating lattice system comprising a thermal neutron fissionable material and a neutron slowing agent for effecting a controlled neutron chain reaction from the fissionable material, liquid uranium hexafluoride in said system as the fissionable material, continuous means for withdrawing the uranium hexafluoride from the lattice system for removing heat therefrom, and means for separating elements 93 and 94 and fission products from the uranium hexafluoride flowing in the system.

7. In a device for effecting a controlled nuclear chain reaction from uranium, liquid uranium hexafluoride in the system as a source of uranium, and heavy water and graphite in said system as neutron slowing down agents, means for passing the uranium hexafluoride in parallel flow through the heavy water and the graphite.

8. A device of the class described comprising a mass of heavy water, graphite surrounding the mass, a plurality of tubes passing through the heavy water, additional tubes passing parallel to the first mentioned tubes and through the graphite disposed around the heavy water, liquid uranium haxafluoride in the tubes, and a fluid circulating system for the uranium hexafluoride including the tubes and means for circulating the uranium hexafluoride.

9. In a device of the class described, a lattice system comprising a core of uranium imbedded in a matrix of graphite, and a structure surrounding the core and comprising a plurality of tubes imbedded in a matrix of graphite, liquid uranium hexafluoride in said tubes, and means for circulating uranium hexafluoride through said tubes.

10. In a device for effecting a controlled nuclear chain reaction from uranium, a lattice system including a core comprising a source of uranium in a neutron slowing agent, and a structure surrounding the core and consisting of a plurality of tubes imbedded in a matrix of graphite, liquid uranium hexafluoride in the tubes, and means for circulating uranium hexafluoride through said tubes.

11. A device for effecting a controlled nuclear chain reaction comprising a lattice system of heavy water and pipes passing therethrough, a fluid circulating system including the said pipes and a heat exchanger, a charge of liquid uranium hexafluoride in the circulating system in a sufficient quantity to furnish uranium to support the chain reaction, and means for circulating the uranium hexafluoride through the circulating system.

12. In a system for the continuous production of neutrons, liquid uranium hexafluoride circulated through a neutron slowing agent of low capture cross section, and means for continually removing elements 93, 94 and fission products from the uranium hexafluoride.

13. A device for effecting a controlled nuclear chain reaction comprising a lattice system of graphite with pipes imbedded in the graphite and disposed in spaced relationship throughout the graphite, a fluid circulating system including the imbedded pipes, a charge of liquid uranium hexafluoride in the circulating system in a sufficient quantity to furnish $U^{235}$ to support the chain reaction, means for circulating the uranium hexafluoride through the circulating system, means for bleeding off some of the uranium hexafluoride from the circulating system, and means for adding uranium hexafluoride to the system.

14. A device for effecting a controlling nuclear chain reaction comprising aluminum pipes arranged in spaced relationship in heavy water, a fluid circulating system including the pipes and a heat exchanger, a charge of liquid uranium hexafluoride in the circulating system in a sufficient quantity to furnish $U^{235}$ to support the chain reaction and means for circulating the uranium hexafluoride through the circulating system.

15. A device for effecting a controlled nuclear chain reaction comprising a plurality of pipes arranged in spaced relationship in heavy water, a fluid circulating system including the pipes and a heat exchanger, a charge of liquid uranium hexafluoride in the circulating system in a sufficient quantity to furnish $U^{253}$ to support the chain reaction, and means for circulating the uranium hexafluoride through the circulating system.

16. A device for effecting a controlled nuclear chain reaction comprising a central core of aluminum tubes spaced in heavy water, surrounded by an outer system comprising uranium tubes arranged in spaced relationship in graphite, a fluid circulatnig system including the aluminum and uranium pipes and a heat exchanger, a charge of liquid uranium hexafluoride in the circulating system in a sufficient quantity to furnish $U^{235}$ to support the chain reaction, and means for circulating the uranium hexafluoride through the circulating system.

17. A device for effecting a controlled nuclear chain reaction comprising a central core of uranium rods arranged in passages disposed in graphite, an outer system comprising uranium tubes arranged in graphite, a fluid circulating system including the uranium tubes in the outer system and a heat exchanger, a charge of uranium hexafluoride in the circulating system in a sufficient quantity to furnish $U^{235}$ to support the chain reaction, means for circulating the uranium hexafluoride through the circulating system, and means for passing a coolant through the passages in the central core in heat exchange relationship with the uranium.

18. A device for effecting a nuclear chain reaction comprising a pair of systems, one of which comprises a plurality of uranium rods arranged in graphite, and the other of which comprises a plurality of uranium tubes arranged in graphite, one of said systems constituting a central core for the device and the other surrounding the core, a fluid circulating system including the uranium tubes and a heat exchanger, a charge of liquid uranium hexafluoride in the fluid circulating system in a sufficient quantity to furnish $U^{235}$ to support the chain reaction, means for circulating the uranium hexafluoride through the fluid circulating system, and means for passing a coolant in heat exchange relationship with the uranium rods.

19. A nuclear fission chain reaction system comprising a reaction unit including neutron slowing agent of low capture cross section and means for receiving liquid uranium hexafluoride separate from the neutron slowing agent, means for removing heat from a liquid, means connecting said liquid uranium hexafluoride receiving means and said heat removing means and forming therewith a continuous passage, liquid uranium hexafluoride in said continuous passage, the amount of uranium hexafluoride outside the reaction unit being a multiple of that in the reaction unit whereby the effect on the chain reaction of impurities formed in the uranium hexafluoride in the reaction unit is reduced by such ratio of uranium hexafluoride outside to inside the reaction unit, and means for circulating said uranium hexafluoride.

20. A nuclear fission chain reaction system comprising a reaction unit including neutron slowing agent of low capture cross section and means for receiving liquid uranium hexafluoride apart from the neutron slowing agent, means for removing heat from a liquid, means connecting said liquid uranium hexafluoride receiving means and said heat removing means and forming therewith a continuous passage, liquid uranium hexafluoride in said continuous passage, and means for circulating said uranium hexafluoride comprising a density differential between the uranium hexafluoride in said uranium hexafluoride receiving means and that in other parts of said continuous passage.

21. A device for effecting a controllable nuclear chain reaction comprising pipes arranged in spaced relationship in heavy water, a fluid circulating system including the pipes and a heat exchanger, a charge of liquid uranium hexafluoride in the circulating system in a sufficient quantity to furnish $U^{235}$ to support the chain reaction, and means for circulating the uranium hexafluoride through the circulating system comprising a density differential in the uranium hexafluoride in the pipes and that in other parts of the circulating system.

22. A nuclear fission chain reaction system comprising a reaction chamber, tubes extending through said chamber, neutron moderating material in said chamber, means for removing heat from a fluid, means connecting said tubes and said heat removing means forming therewith a continuous passage, and thermosyphon circulated liquid uranium hexafluoride filling said continuous passage.

23. A nuclear fission chain reaction system comprising a reaction chamber, tubes extending through said chamber, neutron moderating means in said chamber, means for removing heat from a fluid, conduits connecting said tubes and said heat removing means and forming therewith a continuous circuit, and liquid uranium hexafluoride filling said continuous circuit, there being a density differential between the uranium hexafluoride in the tubes and in other parts of the circuit effecting a continuous flow of the uranium hexafluoride in said continuous circuit due to a density differential in the uranium hexafluoride.

24. A nuclear fission chain reaction system comprising a reaction chamber, tubes extending through said chamber, neutron moderating means in said chamber, means for removing heat from a fluid, means connecting said tubes and said heat removing means forming therewith a continuous passage, liquid uranium hexafluoride in said continuous passage, and means circulating said uranium hexafluoride comprising a density differential between the uranium hexafluoride in said tubes and that in other parts of said continuous passage.

25. A nuclear fission chain reaction system comprising a reaction chamber, tubes extending through said chamber, neutron moderating means in said chamber, means for removing heat from a fluid, means connecting said tubes and heat removing means forming a continuous passage, liquid uranium hexafluoride in said continuous passage, there being heat developed in the uranium hexafluoride in the tubes by nuclear fission, and means for circulating the uranium hexafluoride in order to pass the same through the heat removing means for removing heat therefrom comprising a density differential between the uranium hexafluoride in the tubes and that in other parts of the continuous passage.

References Cited in the file of this patent

UNITED STATES PATENTS

| | | |
|---|---|---|
| 2,206,634 | Fermi et al. | July 2, 1940 |
| 2,708,656 | Fermi et al. | May 17, 1955 |

FOREIGN PATENTS

| | | |
|---|---|---|
| 114,150 | Australia | May 2, 1940 |
| 115,151 | Australia | May 3, 1940 |
| 861,390 | France | Feb. 7, 1941 |
| 233,011 | Switzerland | Oct. 2, 1944 |

OTHER REFERENCES

Uranium and Aatomic Power, Dement and Dake, pub. by Chem. Publ. Co., Brooklyn, N.Y. (1941), pp. 61 and 66.

Kelly et al.: Physical Review 73, 1135–9 (1948). Copy in Patent Office Library.

Goodman: "The Science and Engineering of Nuclear Power," volume 1, pages 305–309, Addison-Wesley Press, Inc., Cambridge, Mass. (1947).